United States Patent
Sato

(10) Patent No.: US 9,607,240 B2
(45) Date of Patent: Mar. 28, 2017

(54) IMAGE PROCESSING APPARATUS, IMAGE CAPTURING APPARATUS, IMAGE PROCESSING METHOD, IMAGE CAPTURING METHOD, AND NON-TRANSITORY COMPUTER-READABLE MEDIUM FOR FOCUS BRACKETING

(71) Applicant: CANON KABUSHIKI KAISHA, Tokyo (JP)

(72) Inventor: Yosuke Sato, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 14/728,390

(22) Filed: Jun. 2, 2015

(65) Prior Publication Data
US 2015/0358542 A1    Dec. 10, 2015

(30) Foreign Application Priority Data
Jun. 6, 2014 (JP) ................................ 2014-118114

(51) Int. Cl.
*H04N 5/228*       (2006.01)
*H04N 5/232*       (2006.01)
(Continued)

(52) U.S. Cl.
CPC ......... *G06K 9/4604* (2013.01); *G06K 9/6203* (2013.01); *G06T 5/003* (2013.01); *G06T 5/50* (2013.01); *H04N 5/2258* (2013.01); *H04N 5/2356* (2013.01); *H04N 5/23232* (2013.01); *H04N 5/265* (2013.01); *G06T 2207/10012* (2013.01); *G06T 2207/10148* (2013.01); *G06T 2207/20221* (2013.01)

(58) Field of Classification Search
CPC ........ G06K 9/6215; G06T 2207/10012; G06T 2207/10148; G06T 2207/20021; G06T 2207/20201; G06T 2207/20221; G06T 5/50; H04N 5/23251; H04N 5/2356
USPC ............. 348/48, 222.1, 345, 362; 396/79–82
See application file for complete search history.

(56) References Cited

U.S. PATENT DOCUMENTS 6,148,151 A * 11/2000 Bauer .................... G02B 7/102
                                                                348/E5.042
9,094,675 B2 * 7/2015 Lukk .................. H04N 13/0011
(Continued)

FOREIGN PATENT DOCUMENTS

JP        4997043 A       8/2012

OTHER PUBLICATIONS

Jacobs, David E., Jongmin Baek, and Marc Levoy. "Focal stack compositing for depth of field control." StanfordComputer Graphics Laboratory Technical Report 1 (2012).

*Primary Examiner* — Trung Diep
(74) *Attorney, Agent, or Firm* — Canon U.S.A., Inc. IP Division

(57) ABSTRACT

An image processing apparatus includes an obtaining unit and an arranging unit. The obtaining unit obtains a first image, a second image, and a third image. The first image is an image captured with the focus set at a first distance. The second image is an image captured with the focus set at a second distance different from the first distance. The third image is an image captured using an f-number larger than an f-number used in capturing of the first image and the second image. The arranging unit arranges at least a part of the first image and at least a part of the second image at a position based on the third image.

7 Claims, 10 Drawing Sheets

(51) Int. Cl.
  *G03B 17/00* (2006.01)
  *G06K 9/46* (2006.01)
  *H04N 5/265* (2006.01)
  *G06T 5/00* (2006.01)
  *H04N 5/235* (2006.01)
  *G06T 5/50* (2006.01)
  *H04N 5/225* (2006.01)
  *G06K 9/62* (2006.01)

(56) References Cited

U.S. PATENT DOCUMENTS 9,241,111 B1 * 1/2016 Baldwin ................ G03B 35/08
9,319,581 B2 * 4/2016 Cheng ..................... G06K 9/40

* cited by examiner

IMAGE PROCESSING APPARATUS, IMAGE CAPTURING APPARATUS, IMAGE PROCESSING METHOD, IMAGE CAPTURING METHOD, AND NON-TRANSITORY COMPUTER-READABLE MEDIUM FOR FOCUS BRACKETING

BACKGROUND OF THE INVENTION

Field of the Invention

The present invention relates to focus bracketing based on simultaneous image capturing from a plurality of viewpoints.

Description of the Related Art

Bracketing is one of image capturing methods for cameras. Specifically, bracketing is an image capturing method for continuously capturing a plurality of images within a short period of time while changing the image capturing settings. The photographic image quality, which is difficult to achieve with one image, can be realized by using a plurality of images obtained by bracketing.

Types of bracketing include, for example, exposure bracketing and flash bracketing. In exposure bracketing, continuous image capturing is performed while changing the exposure. In flash bracketing, continuous image capturing is performed while switching on and off the flash. One typical type of such types of bracketing is focus bracketing in which continuous image capturing is performed while changing the in-focus position (Japanese Patent No. 4997043).

Specifically, focus bracketing is an image capturing method for obtaining a plurality of images focused at different distances by capturing an image multiple times while changing the focus distance so that a proximal subject, an intermediate subject, and a distal subject sequentially come into focus, for example. During focus bracketing, the f-number of the lens is usually set to be small at the time of image capturing. This setting makes each image have a shallow depth of field but makes the amount of incident light for forming the image large, yielding a sharp image having relatively less image capturing noise than a deep-depth-of-field image captured with a large f-number.

A depth-of-field extending process such as the one disclosed in David E. Jacobs, Jongmin Baek, and Marc Levoy, "Focal Stack Compositing for Depth of Field Control", Stanford Computer Graphics Laboratory Technical Report 1 (2012): 2012 is known as a usage of a plurality of images obtained by focus bracketing. Specifically, the depth-of-field extending process is a process for generating a deep-depth-of-field image having a wide in-focus range by combining a plurality of shallow-depth-of-field images focused at different distances. The use of this process can provide a deep-depth-of-field image having less noise than an image captured with a large f-number.

A common issue in bracketing is blurring of the subject in images due to a hand-induced camera shake or movement of the subject during image capturing. This issue arises due to continuous capturing of a plurality of images. Accordingly, it is effective to decrease a period of time taken for image capturing. For example, the issue can be dealt with by simultaneously capturing images using a camera including a plurality of image capturing units.

However, images obtained by simultaneous image capturing using the camera described above are images captured from different viewpoints. Accordingly, position alignment needs to be performed on the images before the images are combined in a process such as the depth-of-field extending process. A process for aligning positions of a plurality of images typically employs a method for deriving correspondences between images and shifting the individual images in accordance with the derived correspondences. However, because images obtained by focus bracketing are images having different in-focus states, it is difficult to derive correspondences between the images and thus to accurately determine image shifting amounts used in position alignment of the images.

SUMMARY OF THE INVENTION

An aspect of the present invention provides a technique for accurately aligning positions of a plurality of images that are simultaneously captured from a plurality of viewpoints different from one another with the focus set at different distances.

An image processing apparatus according to an aspect of the present invention includes an obtaining unit and an arranging unit. The obtaining unit obtains a first image, a second image, and a third image. The first image is an image captured with focus set at a first distance. The second image is an image captured with focus set at a second distance different from the first distance. The third image is an image captured using an f-number larger than an f-number used in capturing of the first image and the second image. The arranging unit arranges at least a part of the first image and at least a part of the second image at a position based on the third image.

Further features of the present invention will become apparent from the following description of exemplary embodiments with reference to the attached drawings.

DESCRIPTION OF THE EMBODIMENTS

First Exemplary Embodiment

Figure 1A:
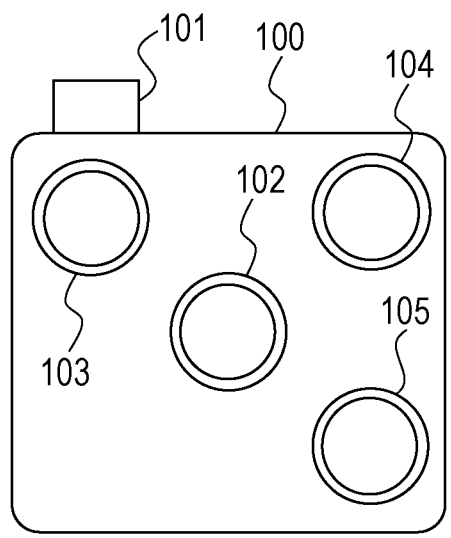
FIGS. 1A and 1B are diagrams illustrating an external view of an array camera according to a first exemplary embodiment.
Figure 1B:
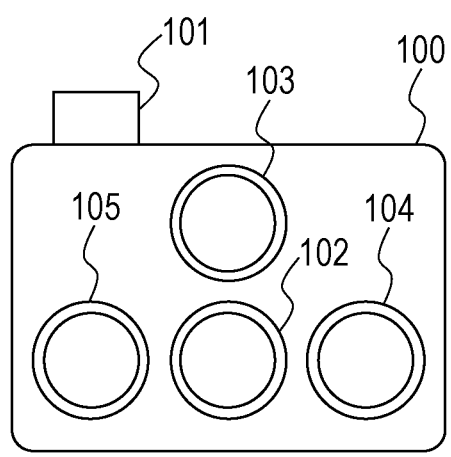

In a first exemplary embodiment, an example will be described in which focus bracketing is performed using a multi-lens multi-viewpoint image capturing apparatus including a plurality of image capturing units and a depth-of-field extending process is performed using the obtained image data items. First, a configuration according to the first exemplary embodiment will be described. FIG. 1A is a diagram illustrating an example of an array camera (hereinafter, simply referred to as a camera) 100 which is a multi-viewpoint image capturing apparatus used in the first exemplary embodiment. The camera 100 includes an image capturing button 101 and image capturing units 102 to 105. The image capturing units 102 to 105 are capable of simultaneously starting capturing images upon a user pressing the image capturing button 101 and of obtaining images (digital data items) of a single subject simultaneously captured from a plurality of viewpoints. Four image capturing units are used in the first exemplary embodiment; however, the number of image capturing units is not limited to four, and the first exemplary embodiment of the present invention is applicable regardless of the number of image capturing units as long as the image capturing apparatus includes a plurality of image capturing units. In addition, an arrangement of the image capturing units 102 to 105 is not limited to the one illustrated in FIG. 1A, and the image capturing units 102 to 105 may be arranged in a manner illustrated in FIG. 1B, for example. In FIGS. 1A and 1B, the image capturing units 102 to 105 are arranged (calibrated) such that optical axes of the image capturing units 102 to 105 are parallel to one another.

Figure 2A:
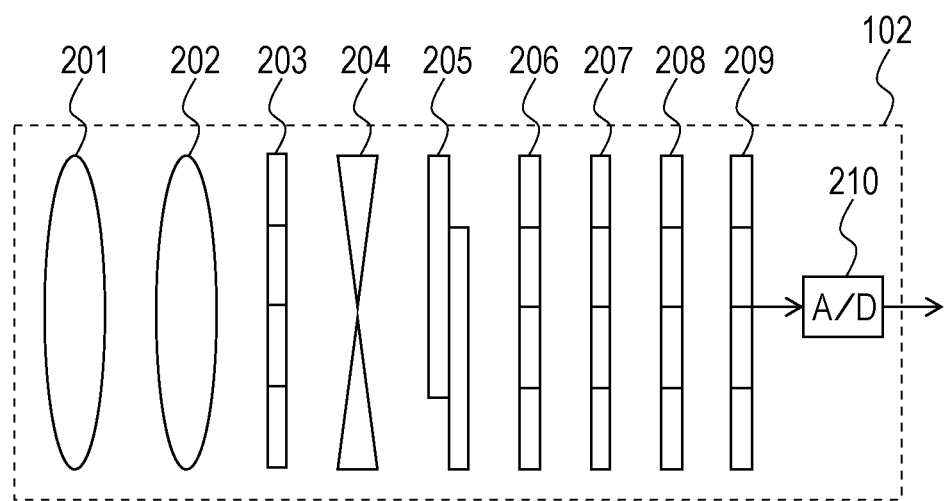
FIGS. 2A and 2B are diagrams illustrating an internal configuration of image capturing units of the array camera according to the first exemplary embodiment.

FIG. 2A is a diagram illustrating an example of an internal configuration of the image capturing unit 102. The image capturing unit 102 includes lenses (i.e., a focus lens 201 and a blur correction lens 202), a neutral density (ND) filter 203, a diaphragm 204, a shutter 205, an optical low-pass filter 206, an infrared (IR) cut filter 207, a color filter 208, a sensor 209, and an analog-to-digital (A/D) converter 210. The sensor 209 is, for example, a complementary metal oxide semiconductor (CMOS) sensor or a charge coupled device (CCD) sensor. The sensor 209 converts an optical image of a subject formed by the focus lens 201 and the blur correction lens 202 into an electric signal. An amount of light detected by the sensor 209 is output as an analog value from the sensor 209 to the A/D converter 210. The A/D converter 210 then converts the analog value into a digital value. The resulting digital data is output to a bus 301 illustrated in FIG. 3.

Figure 2B:
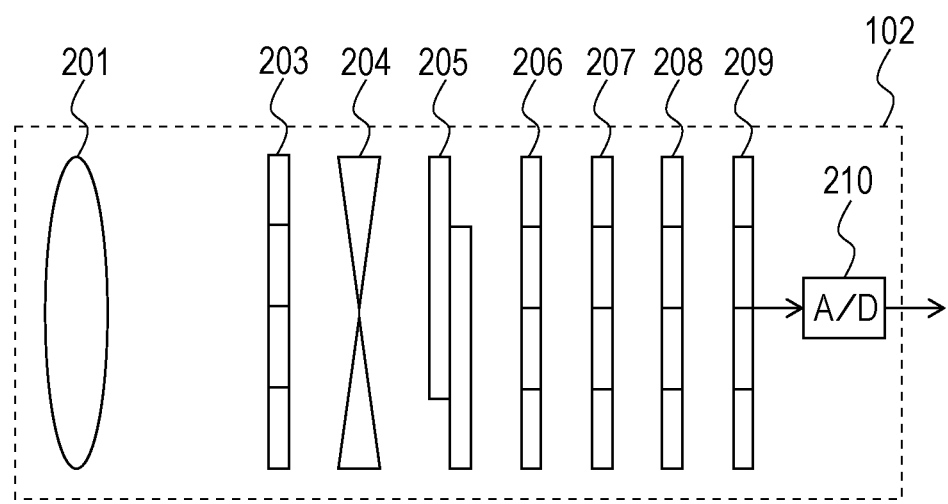

FIG. 2B is a diagram illustrating another example of the internal configuration of the image capturing unit 102. A difference from the internal configuration illustrated in FIG. 2A is that the image capturing unit 102 illustrated in FIG. 2B does not include the blur correction lens 202. That is, the image capturing unit 102 does not have an optical blur correction function. This configuration makes the total weight of the lenses lighter and the length of the image capturing unit 102 shorter. In the first exemplary embodiment, the image capturing unit 102 can have any internal configuration. In the following description of the first exemplary embodiment, it is assumed that the image capturing unit 102 has the internal configuration illustrated in FIG. 2B. Note that the image capturing units 103 to 105 (not illustrated) have an internal configuration similar to that of the image capturing unit 102 illustrated in FIG. 2B.

Figure 3:
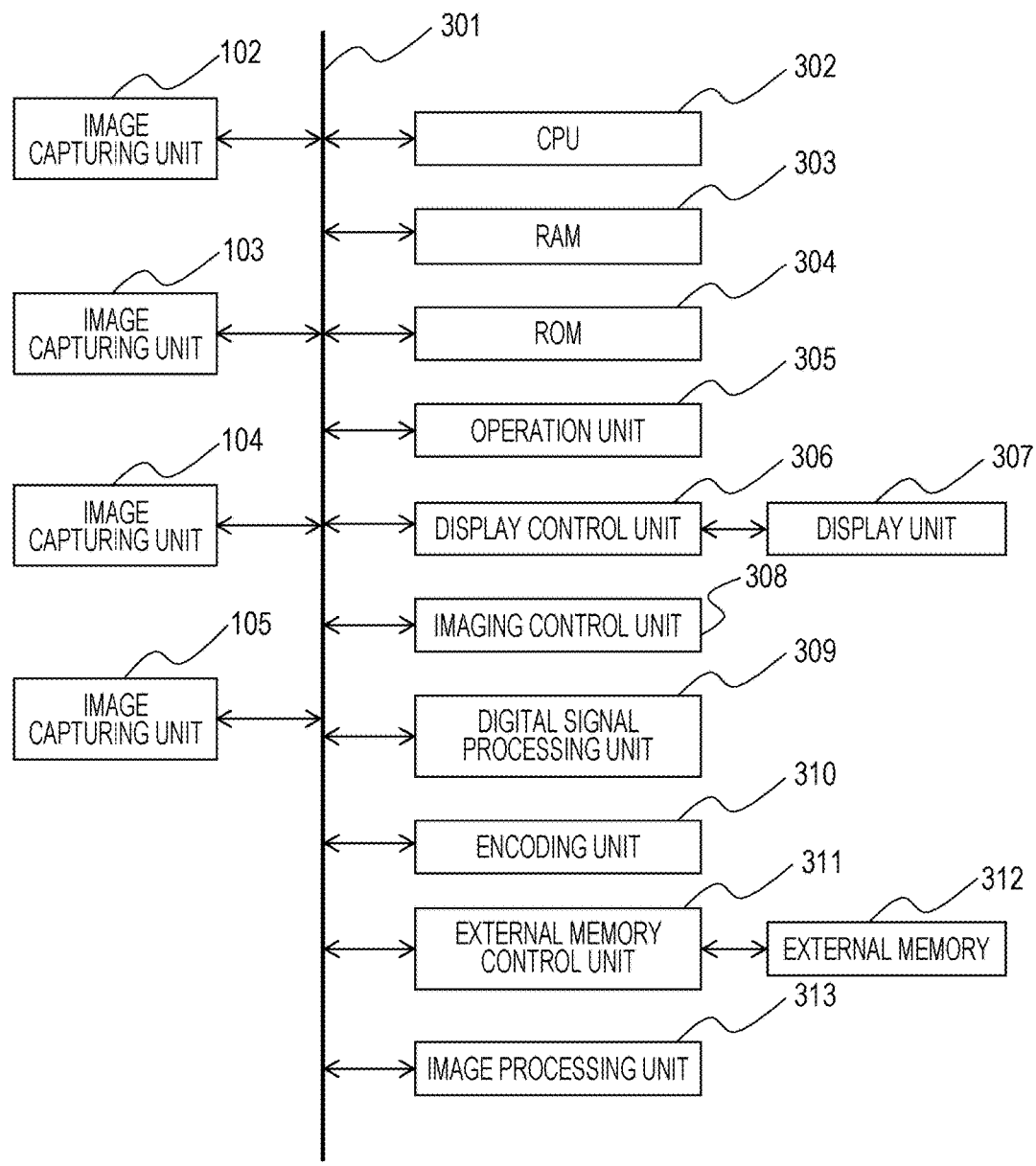
FIG. 3 is a block diagram illustrating an internal configuration of the array camera according to the first exemplary embodiment.

FIG. 3 is a block diagram illustrating an internal configuration of the camera 100. A central processing unit (CPU) 302 integrally controls individual components described below. A random access memory (RAM) 303 functions as a main memory and a work area for the CPU 302. A read-only memory (ROM) 304 stores programs such as a control program executed by the CPU 302.

The bus 301 serves as a path over which various data items are transferred. For example, digital data items obtained by the image capturing units 102 to 105 are transferred to individual components via the bus 301. An operation unit 305 is a user interface that accepts an instruction from a user. Specifically, the operation unit 305 includes buttons and a mode dial, for example, and is capable of accepting an image capturing instruction and a zoom instruction. A display unit 307 is a display that displays a captured image and text. For example, a liquid crystal display is used as the display unit 307. The display unit 307 may have a touchscreen function. In such a case, a user instruction such as an image capturing instruction or a zoom instruction entered with the touchscreen can be handled as an input of the operation unit 305.

A display control unit 306 is a control circuit that controls display of an image or text on the display unit 307. An imaging control unit 308 is a control circuit that controls optical systems of the image capturing units 102 to 105 in accordance with an instruction from the CPU 302 so as to adjust the focus, open or close the shutter, and adjust the diaphragm. The camera 100 simultaneously captures images using the image capturing units 102 to 105 after setting certain f-numbers and focus distances in the respective image capturing units 102 to 105 under control of the imaging control unit 308. A digital signal processing unit 309 is a processing circuit that performs various types of image processing such as white balance processing, gamma processing, and noise reduction processing on a digital data item received via the bus 301.

An encoding unit 310 is a processing circuit that converts a digital data item received via the bus 301 into a data item of a file format such as the Joint Photographic Experts Group (JPEG) format or the Moving Picture Experts Group (MPEG) format. An external memory control unit 311 is an interface that connects an external memory 312 (e.g., a personal computer (PC), a hard disk, a memory card, a compact flash (CF) card, an SD card, or a Universal Serial Bus (USB) memory) to the camera 100. An image processing unit 313 is a processing circuit that performs image processing such as combining images by using digital data items obtained by the image capturing units 102 to 105 or digital data items output from the digital signal processing unit 309. The image processing unit 313, which serves as the image processing apparatus disclosed in the first exemplary embodiment, performs image processing for virtually generating an image captured from a single viewpoint from images captured from different viewpoints by the image capturing units 102 to 105. The camera 100 includes components other than the above-described ones. However, such components are not directly related to the first exemplary embodiment of the present invention, and thus a description thereof is omitted.

Figure 4:
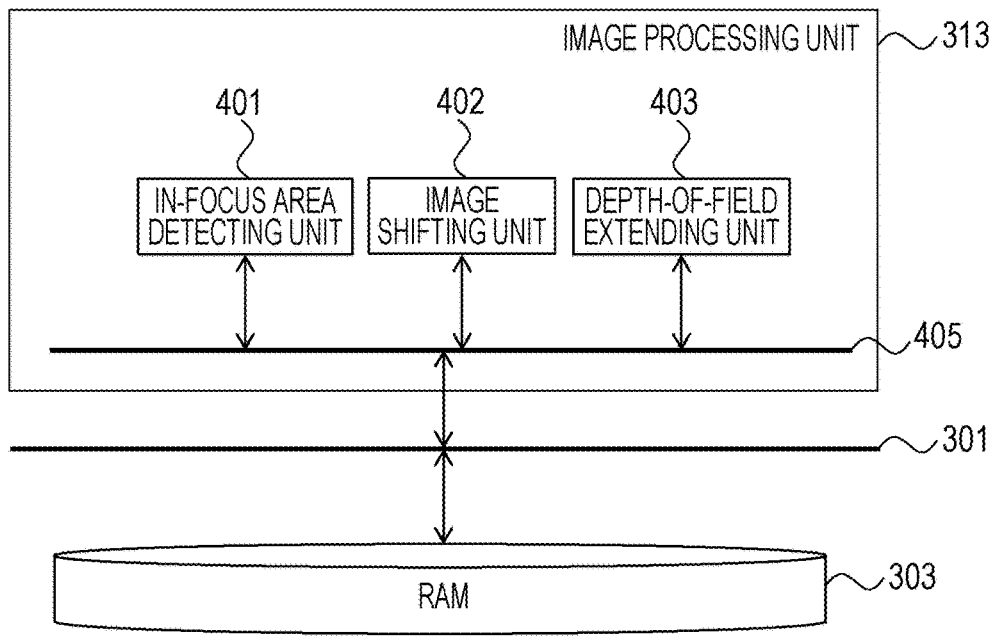
FIG. 4 is a block diagram illustrating a functional configuration of an image processing unit according to the first exemplary embodiment.

The camera 100 according to the first exemplary embodiment has the configuration described above. A process performed by the camera 100 according to the first exemplary embodiment will be described below with reference to the accompanying drawings. FIG. 4 is a functional block diagram illustrating the detailed configuration of the image processing unit 313. The image processing unit 313 includes an in-focus area detecting unit (hereinafter, simply referred to as a detecting unit) 401, an image shifting unit 402, a depth-of-field extending unit (hereinafter, simply referred to as an extending unit) 403, and an interface 405 that connects the aforementioned components to one another. The camera 100 controls the components of the image processing unit 313 illustrated in FIG. 4 to implement a process illustrated in a flowchart of FIG. 5 as a result of the CPU 302 executing a program stored in the ROM 304. The process performed by the image processing unit 313 may be partially or entirely performed by the CPU 302, or the camera 100 may include a processing circuit that automatically performs the process illustrated in the flowchart of FIG. 5 without loading the program.

Figure 5:
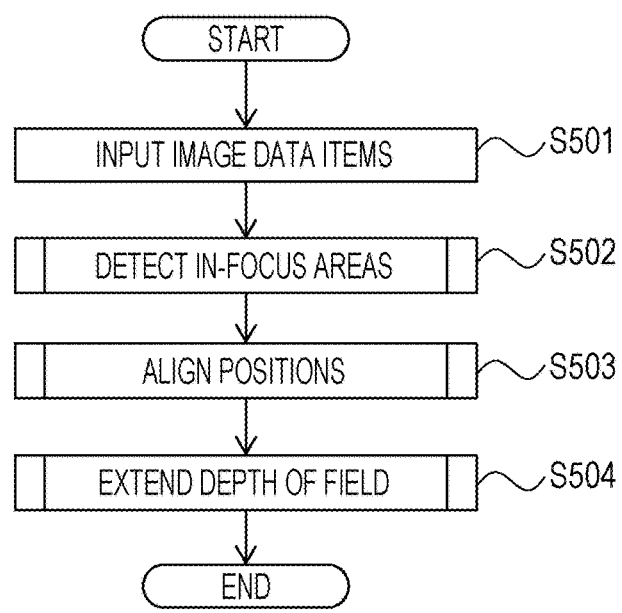
FIG. 5 is a flowchart illustrating a flow of a process performed by the array camera according to the first exemplary embodiment.

FIG. 5 is a flowchart illustrating a flow of a process performed by the camera 100. In step S501, the interface 405 obtains, via the bus 301, image data items obtained as a result of the image capturing units 102 to 105 performing simultaneous image capturing and outputs the image data items to the detecting unit 401 and the image shifting unit 402. Note that the image data items obtained by the interface 405 may be image data items output directly from the image capturing units 102 to 105 or image data items temporarily stored in the RAM 303 or the external memory 312. The image data items used in the process performed by the camera 100 according to the first exemplary embodiment will be described below with reference to FIGS. 6A and 6B.

Figure 6A:
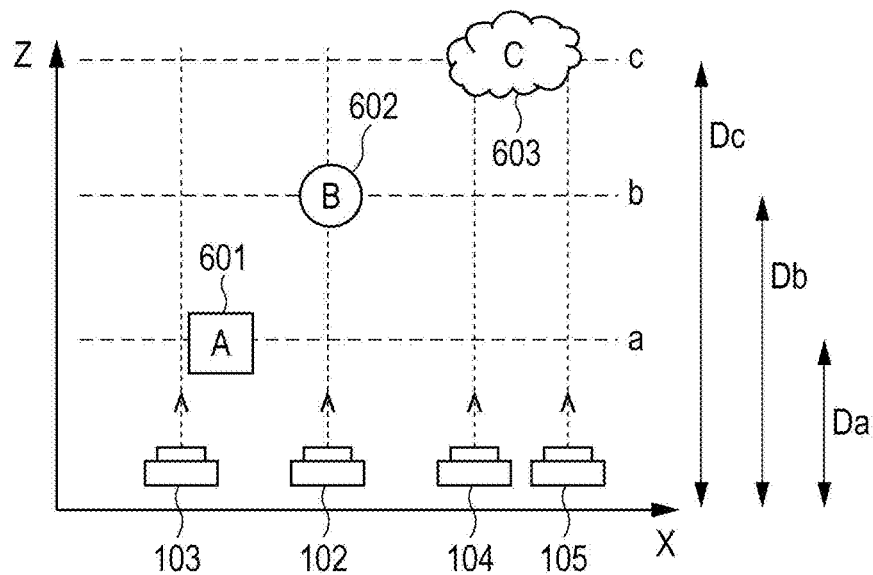
FIGS. 6A and 6B are diagrams explaining image data items according to the first exemplary embodiment.

FIG. 6A is a diagram schematically illustrating a positional relationship between a subject and the image capturing units 102 to 105 according to the first exemplary embodiment. The Z-axis indicates an axis parallel to optical axes of the image capturing units 102 to 105, whereas the X-axis indicates positions of the image capturing units 102 to 105 on a plane perpendicular to the Z-axis. A subject A 601 is located at a position a. A subject B 602 is located at a position b. A subject C 603 is located at a position c. Let Da denote a distance from each of the image capturing units 102 to 105 to the position a, Db denote a distance from each of the image capturing units 102 to 105 to the position b, and Dc denote a distance from each of the image capturing units 102 to 105 to the position c. Then, a relationship among the distances Da, Db, and Dc is denoted as Da<Db<Dc.

Figure 6B:
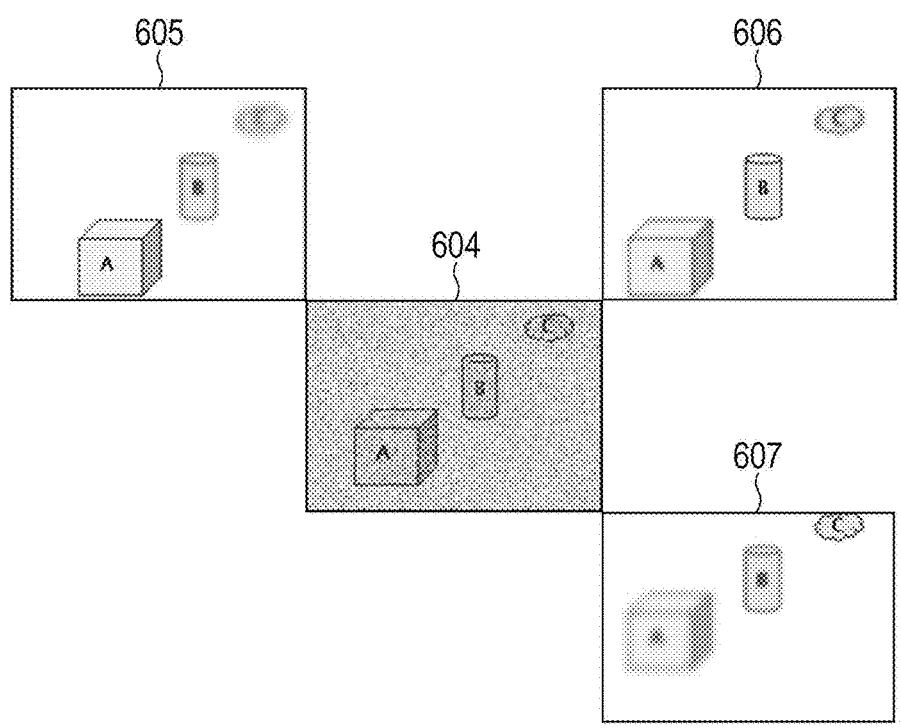

FIG. 6B is a schematic diagram illustrating images obtained by capturing images of a scene illustrated in FIG. 6A by using the image capturing units 102 to 105. Specifically, an image 604 is an image captured by the image capturing unit 102, an image 605 is an image captured by the image capturing unit 103, an image 606 is an image captured by the image capturing unit 104, and an image 607 is an image captured by the image capturing unit 105. A larger f-number is set in the image capturing unit 102 so as to make the depth of field deeper than those of the image capturing units 103 to 105 so that all the subjects, that is, the subject A 601, the subject B 602, and the subject C 603 are in focus. In addition, the image capturing unit 102 captures an image at substantially the same shutter timing for substantially the same exposure period as the image capturing units 103 to 105. With these settings, all the subjects are substantially in focus in the image 604 compared with the images 605 to 607. Such settings, however, make the signal-to-noise (S/N) ratio relatively low in the image 604, resulting in more conspicuous fixed pattern noise and random noise.

The image 605 is an image captured by the image capturing unit 103 so that the subject A 601 is in focus. In addition, the image 606 is an image captured by the image capturing unit 104 so that the subject B 602 is in focus. The image 607 is an image captured by the image capturing unit 105 so that the subject C 603 is in focus. A smaller f-number than that of the image capturing unit 102 is set in the image capturing units 103 to 105 that respectively capture the images 605 to 607. This setting makes the depth of field shallow. Accordingly, one of the subjects is in focus in each of the images 605 to 607. This setting however makes the S/N ratio relatively high in the images 605 to 607, resulting in reduced fixed pattern noise and random noise.

The image capturing units 102 to 105 have different image-capturing viewpoints. For this reason, the viewpoints of the resulting images 604 to 607 are also different. As described above, a plurality of images simultaneously captured by the image capturing units 102 to 105 have different viewpoints. In addition, the plurality of images include a plurality of relatively shallow-depth-of-field images focused at different in-focus positions and a relatively deep-depth-of-field image focused at all the in-focus positions.

The image capturing units 102 to 105 capture images at substantially the same shutter timings. This configuration substantially eliminates variations in the positions of the formed images of the subject in the images 604 to 607 due to movement of the subject or the camera. In addition, the image capturing units 102 to 105 capture images for substantially the same exposure period. This configuration allows the images 604 to 607 to have substantially the same degree of blur of the formed images of the subject due to movement of the subject or the camera.

The overview of the image data items used in the first exemplary embodiment has been described above. The imaging control unit 308 controls the sensor positions and the diaphragms of the image capturing units 102 to 105, whereby the camera 100 according to the first exemplary embodiment captures images with the above-described depths of field or in-focus positions; however, the first exemplary embodiment of the present invention is not limited to this configuration. For example, different values may be set in advance for the diameters and the focus distances of the lenses of the image capturing units 102 to 105 and the sensor positions, so that the above-described images can be captured without control performed by the imaging control unit 308. In addition, the images need not be captured exactly at identical timings, and the case where images are captured at timings shifted by an extremely short interval so that blurring of the subject and hand-induced camera shake are avoided is also considered as simultaneous image capturing. In addition, the image capturing units 103 to 105 capture images using the same f-number in the first exemplary embodiment; however, the image capturing units 103 to 105 may capture images using different f-numbers that are smaller than the f-number of the image capturing unit 102.

The description of the process performed by the camera 100 will be continued below. In step S502, the detecting unit 401 detects an in-focus area in each of the image data items obtained in step S501. Details about this process will be described later. The detecting unit 401 outputs, to the image shifting unit 402, the obtained image data items and information indicating the detected in-focus areas in the image data items. The process then proceeds to step S503. In step S503, the image shifting unit 402 performs position alignment on the image data items obtained in step S501 in accordance with the information indicating the in-focus areas in the image data items input by the detecting unit 401. Details about this process will be described later. The image shifting unit 402 outputs the position-aligned image data items to the extending unit 403. The process then proceeds to step S504.

In step S504, the extending unit 403 combines the position-aligned image data items input from the image shifting unit 402 to generate an image data item having an extended depth of field. Details about this process will be described later.

Figure 7:
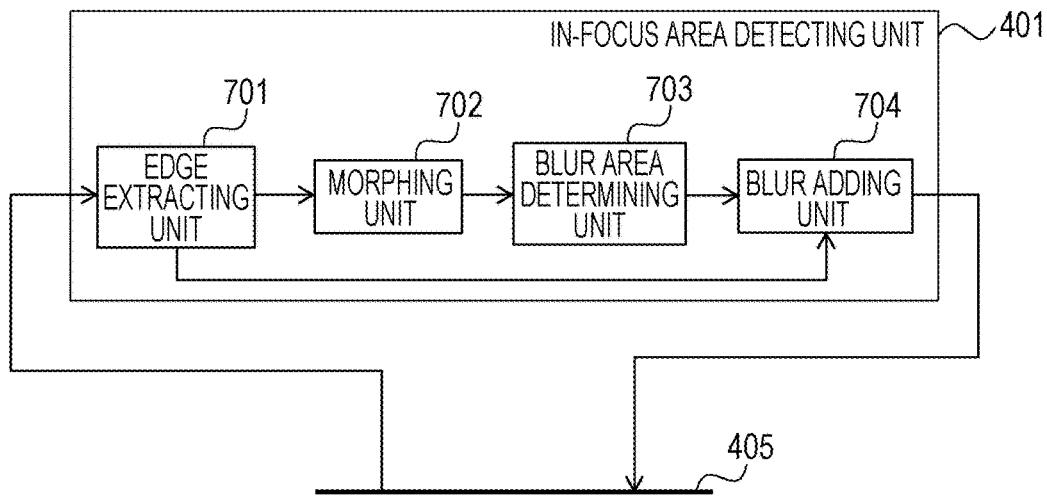
FIG. 7 is a block diagram illustrating a functional configuration of an in-focus area detecting unit according to the first exemplary embodiment.
Figure 8:
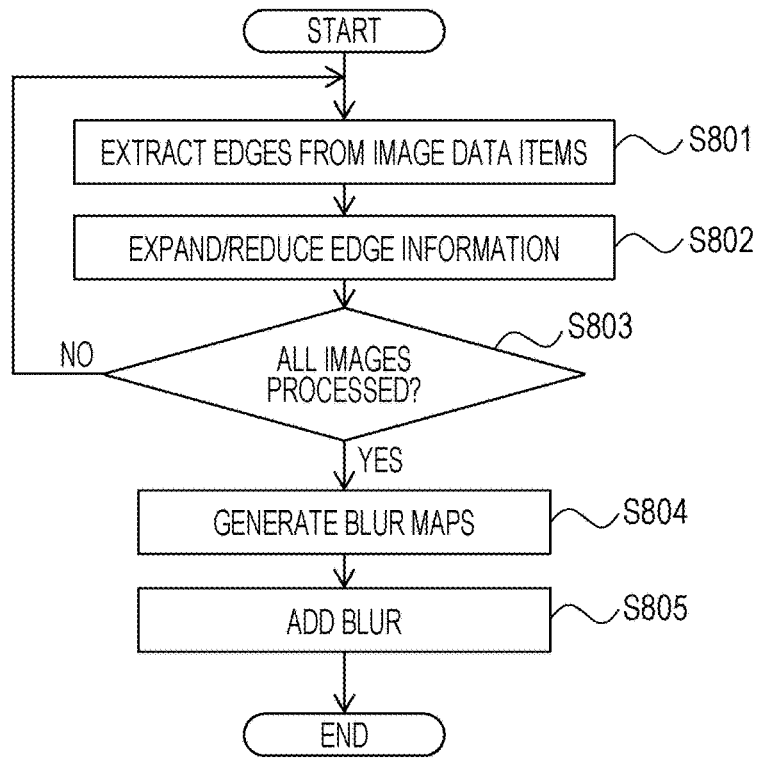
FIG. 8 is a flowchart illustrating a process performed by the in-focus area detecting unit according to the first exemplary embodiment.

The flow of the process performed by the camera 100 according to the first exemplary embodiment has been described above. Details about the individual processes performed by the camera 100 will be described below. First, the in-focus area detection process (S502) performed by the detecting unit 401 will be described with reference to a block diagram of FIG. 7 and a flowchart of FIG. 8. The detecting unit 401 includes an edge extracting unit 701, a morphing unit 702, a blur area determining unit (hereinafter, simply referred to as a determining unit) 703, and a blur adding unit 704.

In step S801, the edge extracting unit 701 extracts information on edges (hereinafter, referred to as edge information) from each of the image data items obtained in step S501. Any available edge extraction method such as the Laplacian filter, the Canny edge extracting method, the Laplacian of Gaussian (LoG) filter, or the difference of Gaussian (DoG) filter may be used. In the first exemplary embodiment, the edge extracting unit 701 extracts edge information from each of the image data items by using the DoG filter. The edge information extracted in this step is image data indicating edge intensity at each pixel position of the image data item subjected to edge extraction. The edge extracting unit 701 outputs the extracted edge information to the morphing unit 702 and the image data items obtained in step S501 to the blur adding unit 704. The process then proceeds to step S802.

In step S802, the morphing unit 702 performs an expansion/reduction process on the edge information extracted in step S801. The expansion/reduction process is implemented by applying an expansion process on an image representing the edge information and then applying a reduction process thereon. The image expansion process is implemented by applying a maximum value filtering process to the image. Here, the maximum value filtering process is a process for determining the maximum value within a patch around a processing-target pixel in the input image. The image reduction process is implemented by applying a minimum value filtering process to the image. Here, the minimum value filtering process is a process for determining the minimum value within a patch around the processing-target pixel in the input image. It is preferable to use a patch having a size larger than 3×3 pixels; however, a filter of another size may be used. Note that the expansion/reduction process performed in this step is a process for extracting an area including many edges from the edge information, and a process other than the expansion/reduction process may be alternatively used. For example, a smoothing filter may be used. It should be also noted that the image expansion/reduction process described above is merely an example. In addition to the above-described image expansion/reduction process, morphology operations such as erosion, dilation, opening, and closing may be used. The morphing unit 702 outputs the edge information that has been subjected to the expansion/reduction process to the determining unit 703. The process then proceeds to step S803.

In step S803, the determining unit 703 determines whether processing of steps S801 and S802 has been performed on all the input image data items. If it is determined that processing of steps S801 and S802 has been performed on all the input image data items, the process proceeds to step S804. If it is determined that processing of steps S801 and S802 has not been performed on all the input image data items, the process returns to step S801 and the processing of steps S801 and S802 is performed on each image data item yet to be processed.

In step S804, the determining unit 703 performs a comparison on the edge information that has been subjected to the expansion/reduction process and that has been input from the morphing unit 702 to generate variance value maps (blur maps) indicating an area for which blur is to be added to the edge information. In this step, the comparison is performed on three sets of edge information. A description will be given on the assumption that an image W is a deep-depth-of-field image captured by the image capturing unit 102, an image A is a shallow-depth-of-field image captured by the image capturing unit 103, an image B is a shallow-depth-of-field image captured by the image capturing unit 104, and an image C is a shallow-depth-of-field image captured by the image capturing unit 105. A first set is a set of edge information of the image W and edge information of the image A. A second set is a set of edge information of the image W and edge information of the image B. A third set is a set of edge information of the image W and edge information of the image C.

Let EdgeShallow$_j$(x, y) denote edge information calculated from each of the shallow-depth-of-field images A to C and EdgeDeep$_j$(x, y) denote edge information calculated from the deep-depth-of-field image W. Then, a variance value map Var$_j$(x, y) to be calculated is expressed by Equation (1) below.

$$Var_j(x, y) = \begin{cases} w & (|a_j| \geq \theta) \\ 0 & (|a_j| < \theta) \end{cases} \quad (1)$$

Note that $a_j$=EdgeDeep$_j$(x, y)−EdgeShallow$_j$(x, y). Also, x and y denote coordinates on the two-dimensional image plane, and w and θ are predetermined constants. In addition, j indicates the number assigned to the shallow-depth-of-field image. Specifically, j=1 indicates the image A, j=2 indicates the image B, and j=3 indicates the image C. That is, three variance value maps respectively corresponding to the images A to C are generated in this step. The variance value maps generated in this step indicate that blur is added in an area where a difference between the image W and any of the images A to C is large and that no blur is added in an area where a difference between the image W and any of the images A to C is small. In this way, information is generated which is used for generating an image in which blur is enhanced in areas other than the in-focus areas of the images A to C. The determining unit 703 outputs, to the blur adding unit 704, the variance value maps that have been generated by substituting the edge information into Equation (1). The process then proceeds to step S805.

In step S805, the blur adding unit 704 performs a blur adding process on the images A to C in accordance with the respective variance value maps. A pixel value ImgShallow- Blur$_j$(x, y) of the blur-added image can be denoted by Equation (2) below by using a point spread function (PSF) of the blur denoted by Equation (3).

$$ImgShallowBlur_j(x, y) = \qquad (2)$$

$$\frac{\Sigma_k \Sigma_l ImgShallow_j\left(x - \frac{u-1}{2} + k, y + \frac{v-1}{2} + 1\right) \times PSF_j(x, y, k, l)}{uv}$$

$$PSF_j(x, y, k, l) = \frac{1}{2 \cdot \pi \cdot Var_j^2(x, y)} \exp\left(\frac{\left(\frac{u-1}{2} - k\right)^2 + \left(\frac{v-1}{2} - 1\right)^2}{2 \cdot Var_j^2(x, y)}\right) \qquad (3)$$

In Equation (2), u and v are constants indicating the size of a filter used for adding blur. For example, in the case where a filter has a size of 5×5 pixels, u=v=5. Also, k and l are constants indicating a reference pixel within an image block, k is an integer that takes a value from 0 to u, and l is an integer that takes a value from 0 to v. Note that Equation (2) is used when both the constants u and v take odd numbers and blur is added by using a filter that is symmetrical about a pixel subjected to similarity calculation, and the equation used can be modified as appropriate in accordance with the shape and arrangement of the filter. The blur adding unit 704 adds blur to the images A to C by using the filter denoted by Equation (2) and then outputs, to the image shifting unit 402, the image W and the blur-added images A to C. The process then ends.

The details about the process performed by the detecting unit 401 have been described above. As a result of this process, image data items in which blur is added in areas other than the in-focus areas of the shallow-depth-of-field images are output to the image shifting unit 402.

Figure 9:
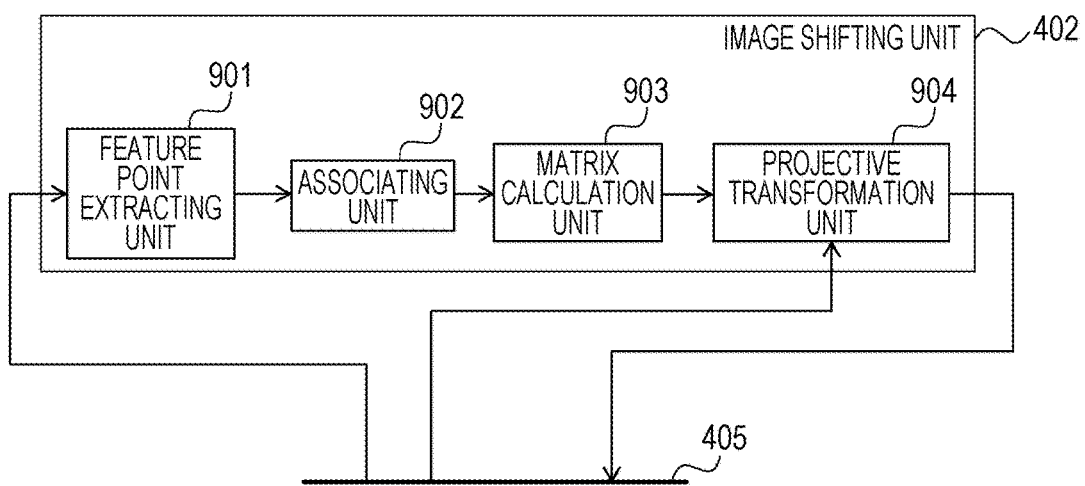
FIG. 9 is a block diagram illustrating a functional configuration of an image shifting unit according to the first exemplary embodiment.
Figure 10:
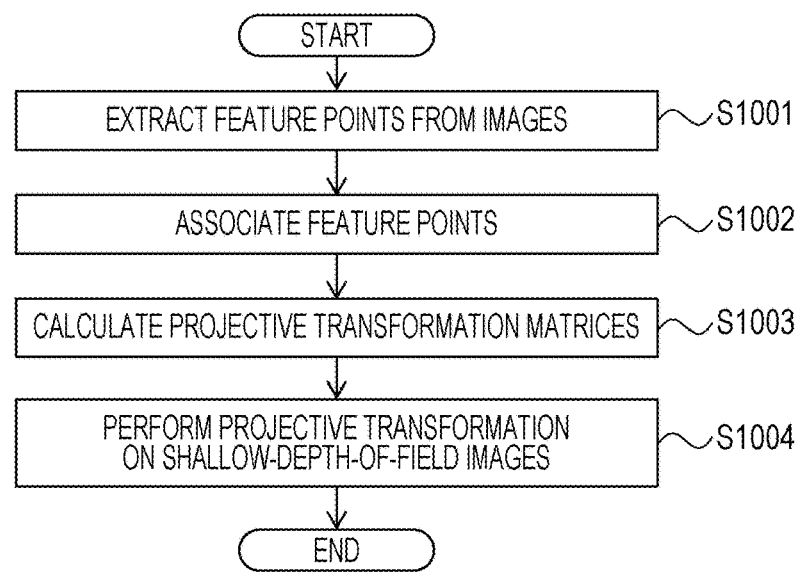
FIG. 10 is a flowchart illustrating a process performed by the image shifting unit according to the first exemplary embodiment.

Next, details about a position alignment process (step S503) performed by the image shifting unit 402 will be described with reference to a block diagram of FIG. 9 and a flowchart of FIG. 10. The image shifting unit 402 includes a feature point extracting unit 901, an associating unit 902, a matrix calculation unit 903, and a projective transformation unit 904. In step S1001, the feature point extracting unit 901 extracts feature points from the deep-depth-of-field image and the blur-added shallow-depth-of-field images which have been input from the detecting unit 401. Any available method such as scale invariant feature tracking (SIFT) or speeded up robust features (SURF) can be used in a feature point extractor used to extract feature points. The feature point extracting unit 901 outputs information indicating the extracted feature points to the associating unit 902. The process then proceeds to step S1002.

In step S1002, the associating unit 902 detects correspondences between a plurality of feature points detected in step S1001. In this step, three sets of correspondences are detected. A first set is a set of correspondences between the feature points detected from the image W and the feature points detected from the blur-added image A. A second set is a set of correspondences between the feature points detected from the image W and the feature points detected from the blur-added image B. A third set is a set of correspondences between the feature points detected from the image W and the feature points detected from the blur-added image C.

The following describes a specific method for detecting a correspondence. The case of using SURF is described by way of example. In SURF, each detected feature point is described by a 64-dimensional feature vector (i.e., 64 feature values). By using such feature values, a feature point having feature values close to those of a feature point in one of two images is searched for from among a plurality of feature points in the other of the two images by performing the K-nearest neighbor search. In particular, in the case of K=1, a feature point having the closest feature values is searched for. A similar process is performed in the case of using SIFT; however, a feature vector used in SIFT is a 128-dimensional vector. The above-described process is performed for three sets of images. Note that the number of sets can be adaptively changed in accordance with the type of images used and the number of images used. The associating unit 902 outputs information indicating the detected correspondences between the feature points to the matrix calculation unit 903. The process then proceeds to step S1003.

In step S1003, the matrix calculation unit 903 calculates a projective transformation matrices (homography matrices) for shifting the images A to C to have the viewpoint of the image W, in accordance with the respective sets of correspondences between feature points detected in step S1002. A homography matrix is a 3×3 matrix and denotes a projective relationship between two images. A homography matrix can be calculated by using coordinate values of a plurality of sets of corresponding feature points in the images. Theoretically, a homography matrix can be calculated from four sets of corresponding points (corresponding feature points); in practice, however, four sets are not enough to accurately calculate a homography matrix. Accordingly, in this step, the number of corresponding points used is increased on the assumption that an error of the coordinate values takes a normal distribution, and the homography matrix is calculated by using the least squares method. Feature points extracted from the images A to C in step S1001 concentrate in the in-focus areas of the images A to C since blur has been added in areas other than the in-focus areas of the images A to C in step S805. For this reason, in this step, homography matrices based on the in-focus areas of the images A to C are calculated, which allows position alignment in which the in-focus areas of the images A to C are accurately superimposed with the corresponding areas of the image W. The matrix calculation unit 903 outputs three calculated homography matrices to the projective transformation unit 904. The process then proceeds to step S1004.

In step S1004, the projective transformation unit 904 performs projective transformation on the images A to C obtained in step S501, by using the respective homography matrices input by the matrix calculation unit 903. The projective transformation unit 904 outputs, to the extending unit 403, the image W and the images A to C that have been subjected to the projective transformation. The process then ends. The details about the process performed by the image shifting unit 402 have been described above. As a result of this process, the in-focus areas of the images A to C are aligned to be accurately superimposed with the corresponding image areas of the image W. In this process, correspondences in the in-focus areas are accurately determined by extracting feature points from blur-added images; however, this processing is not necessarily needed. For example, an area for which feature points are to be extracted may be limited without adding blur after the in-focus areas are determined.

Figure 11:
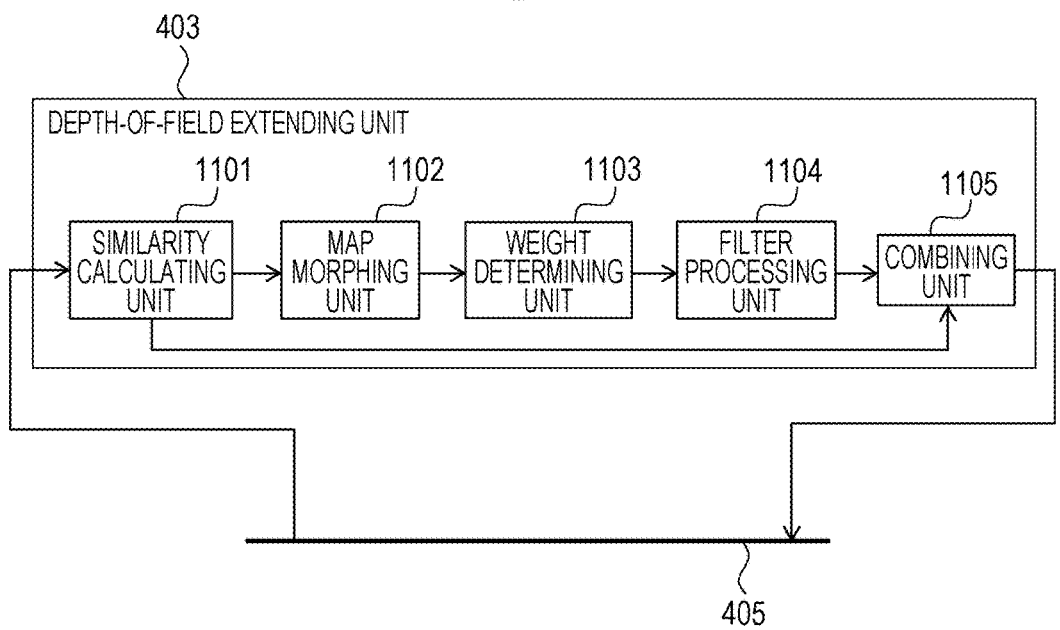
FIG. 11 is a block diagram illustrating a functional configuration of a depth-of-field extending unit according to the first exemplary embodiment.
Figure 12:
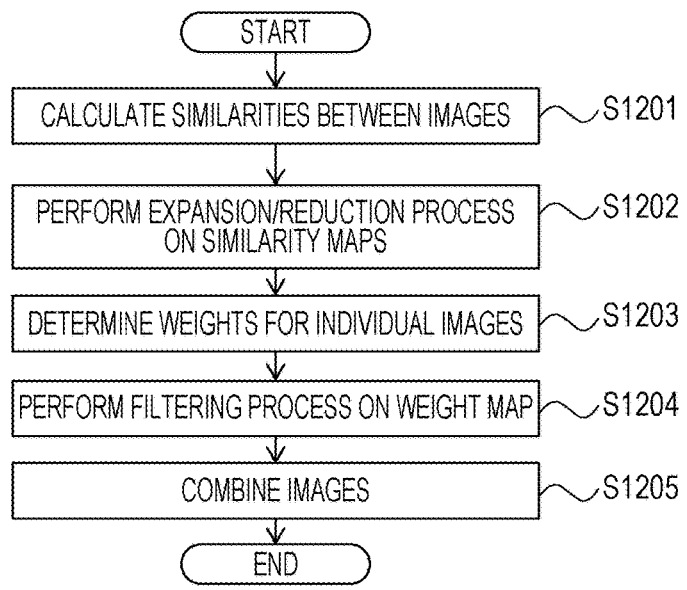
FIG. 12 is a flowchart illustrating a process performed by the depth-of-field extending unit according to the first exemplary embodiment.

Next, details about the depth-of-field extending process (step S504) performed by the extending unit 403 will be described with reference to a block diagram of FIG. 11 and a flowchart of FIG. 12. The extending unit 403 includes a similarity calculating unit 1101, a map morphing unit 1102, a weight determining unit 1103, a filter processing unit 1104, and a combining unit 1105.

In step S1201, the similarity calculating unit 1101 calculates similarities between the image W and the position-aligned images A to C that are input from the image shifting unit 402. The similarities are determined by comparing pixel values in image blocks corresponding to the same pixel position in the image W and the images A to C that have been subjected to the projective transformation. Like the correspondences in step S1002, the similarities are calculated for three sets. The similarity determined in the first exemplary embodiment is denoted by Equation (4) below as a reciprocal of an average of squared differences between pixel values in the corresponding image blocks.

$$S_j(x, y) = 1 \bigg/ \frac{\Sigma_k \Sigma_l \left\{ ImgDeep\left(x - \frac{u-1}{2} + k, y + \frac{v-1}{2} + 1\right) - ImgShift_j\left(x - \frac{u-1}{2} + k, y - \frac{v-1}{2} + 1\right) \right\}^2}{uv} \quad (4)$$

In Equation (4), $S_j(x, y)$ denotes a similarity at a pixel position (x, y), ImgDeep(x, y) denotes a pixel value at the pixel position (x, y) in the image W, and ImgShift$_j$(x, y) denotes a pixel value at the pixel position (x, y) in any of the position-aligned images A to C. In addition, j denotes the number assigned to the images A to C. Specifically, j=1 indicates the image A, j=2 indicates the image B, and j=3 indicates the image C. Also, u and v are constants indicating the size of the image block used in calculation of the similarity. For example, in the case where the image block used in calculation of the similarity has a size of 5×5 pixels, u=v=5. In addition, k and l are constants indicating the processing-target pixel in the image block, k is an integer that takes a value from 0 to u, and l is an integer that takes a value from 0 to v. Equation (4) is used when both the constants u and v take odd numbers and the similarity is calculated by using an image block that is symmetrical about the target pixel subjected to calculation of the similarity, and the equation used can be modified as appropriate in accordance with the shape and arrangement of the image block. Also, various values denoted by other equations may be used as the value indicating the similarity between the image W and any of the images A to C. For example, the L1-norm denoted by Equation (5) may be used.

$$S_j(x, y) = 1 \bigg/ \frac{\Sigma_k \Sigma_l \left| ImgDeep\left(x - \frac{u-1}{2} + k, y + \frac{v-1}{2} + 1\right) - ImgShift_j\left(x - \frac{u-1}{2} + k, y - \frac{v-1}{2} + 1\right) \right|^2}{uv} \quad (5)$$

For example, in the case where pixel values in the corresponding image blocks subjected to calculation of the similarity are exactly the same, the result of the calculation using Equation (5) diverges. For this reason, a sufficiently large similarity value may be assigned if the sum of (squared) differences between "ImgDeep" and "ImgShift" is equal to 0 or is smaller than a threshold. The similarity calculating unit 1101 calculates the similarity by substituting pixel values of the input images into Equation (4), thereby generating similarity maps, on which the similarities of the images A to C to the image W at individual pixels are mapped. The similarity calculating unit 1101 outputs the generated similarity maps to the map morphing unit 1102 and the image W and the position-aligned images A to C to the combining unit 1105. The process then proceeds to step S1202.

In step S1202, the map morphing unit 1102 performs an expansion/reduction process on each of the similarity maps input from the similarity calculating unit 1101. Details about the expansion/reduction process are similar to those performed for the edge information in step S802, and thus a description thereof is omitted. The map morphing unit 1102 outputs the similarity maps that have been subjected to the expansion/reduction process to the weight determining unit 1103. The process proceeds to step S1203.

In step S1203, the weight determining unit 1103 compares the similarity maps input from the map morphing unit 1102 with one another and determines weight values used to combine the images A to C. In this step, for each pixel of the image W, an image having the highest similarity to the image W is selected from among the images A to C, and a weight for the image selected as an image having the highest similarity to the image W is made larger than weights for the other images. This processing is based on the assumption that all the subjects are in focus in the image W, and the image having the highest similarity to the image W at a certain pixel indicates that the subject is in-focus at the pixel as in the image W. Specifically, a weight $W_j(x, y)$ of each image at a pixel position (x, y) is denoted by Equation (6).

$$W_j(x, y) = \begin{cases} 1 & \langle S_j(x, y) = \max_{i \in \{1,2,3\}} (S_i(x, y)) \rangle \\ 0 & \langle S_j(x, y) \neq \max_{i \in \{1,2,3\}} (S_i(x, y)) \rangle \end{cases} \quad (6)$$

By determining weight values based on Equation (6), for each pixel position, a pixel value of the most sharply focused image is selected as a pixel value of the depth-of-field-extended image. Accordingly, an image having a wide in-focus range can be obtained. Note that the weight values are not necessarily set only for the images A to C, and a weight value may be set for the image W. For example, in the case where there is no image for which the similarity $S_j$ is greater than or equal to a threshold at a certain pixel position, it is indicated that none of the images A to C are in focus at the pixel position. Thus, the pixel value of the image W may be selected for the pixel position. Such processing can yield an image for which the depth of field is extended further. The weight values of this case can be set based on Equation (7) in addition to Equation (6).

$$W_j(x, y) = 0 \quad \langle th > \max_{i \in \{1,2,3\}} (S_i(x, y)) \rangle \quad (7)$$

$$W_w(x, y) = \begin{cases} 1 & \langle th > \max_{i \in \{1,2,3\}} (S_i(x, y)) \rangle \\ 0 & \langle th \leq \max_{i \in \{1,2,3\}} (S_i(x, y)) \rangle \end{cases}$$

In Equation (7), $W_w(x, y)$ denotes a weight value for the image W and th denotes a predetermined threshold.

Note that the weight values for the individual images are not necessarily set to 1 or 0, and it is only required that the weight for an image having the highest similarity (or the image W if there is no image having a similarity exceeding a threshold) is made larger than those for the other images. The weight determining unit 1103 outputs a weight value map determined based on Equation (6) to the filter processing unit 1104. The process then proceeds to step S1204.

In step S1204, the filter processing unit 1104 processes the weight value maps output from the weight determining unit 1103, by using a convolution filter. In the first exemplary embodiment, blur is added by using a Gaussian filter; however, any filter that can be used to blur the weight value map can widely used. This processing makes boundaries between areas less conspicuous after the images are combined. The filter processing unit 1104 outputs the weight value map that has been subjected to the filtering process and the position-aligned images A to C to the combining unit 1105. The process then proceeds to step S1205.

In step S1205, the combining unit 1105 combines the position-aligned images A to C in accordance with the weight value map output from the filter processing unit 1104. A pixel value O(x, y) in the resulting image is denoted by Equation (8).

$$O(x,y) = \Sigma_j W_j \cdot \mathrm{ImgShift}_j(x,y) \quad (8)$$

In the case where a weight value is also set for the image W in step S1203, the pixel value O(x, y) in the resulting image is denoted by Equation (9).

$$O(x,y) = W_w \cdot \mathrm{ImgDeep}(x,y) + \Sigma_j W_j \cdot \mathrm{ImgShift}_j(x,y) \quad (9)$$

The combining unit 1105 generates a depth-of-field-extended composite image by substituting the weight values and the pixel values to Equation (8) or (9) and outputs the composite image to the display control unit 306 or the external memory control unit 311. The process then ends.

The process performed by the camera 100 according to the first exemplary embodiment has been described above. The process described above enables accurate position alignment of a plurality of images that are simultaneously captured from a plurality of viewpoints different from one another with the focus set at different distances, and consequently provides an excellent image having an extended depth of field. In the case of using the image W in combining based on Equation (9) or the like, a deep-depth-of-field image with less noise can be obtained by combining the images after applying an edge-preserving smoothing filter to the image W, for example.

In the first exemplary embodiment, the imaging control unit 308 functions as a controller configured to control optical systems included in a plurality of image capturing units. In addition, the interface 405 functions as an obtaining unit configured to obtain a first image captured with the focus set at a first distance and a second image captured with the focus set at a second distance different from the first distance. The interface 405 also functions as the obtaining unit configured to obtain a third image captured by using an f-number larger than an f-number used in capturing of the first image and the second image. The image shifting unit 402 functions as an arranging unit configured to arrange at least a part of the first image and at least a part of the second image at a position based on the third image. In addition, the extending unit 403 functions as a combining unit configured to generate a composite image having a deeper depth of field than the first image and the second image by combining the first image and the second image that have been arranged by the arranging unit. The similarity calculating unit 1101 functions as a calculating unit configured to calculate a parameter indicating, for each image area corresponding to an identical position in the first image that has been arranged by the arranging unit and the third image, a similarity between the first image and the third image and indicating, for each image area corresponding to an identical position in the second image that has been arranged by the arranging unit and the third image, a similarity between the second image and the third image.

Second Exemplary Embodiment

Figure 13:
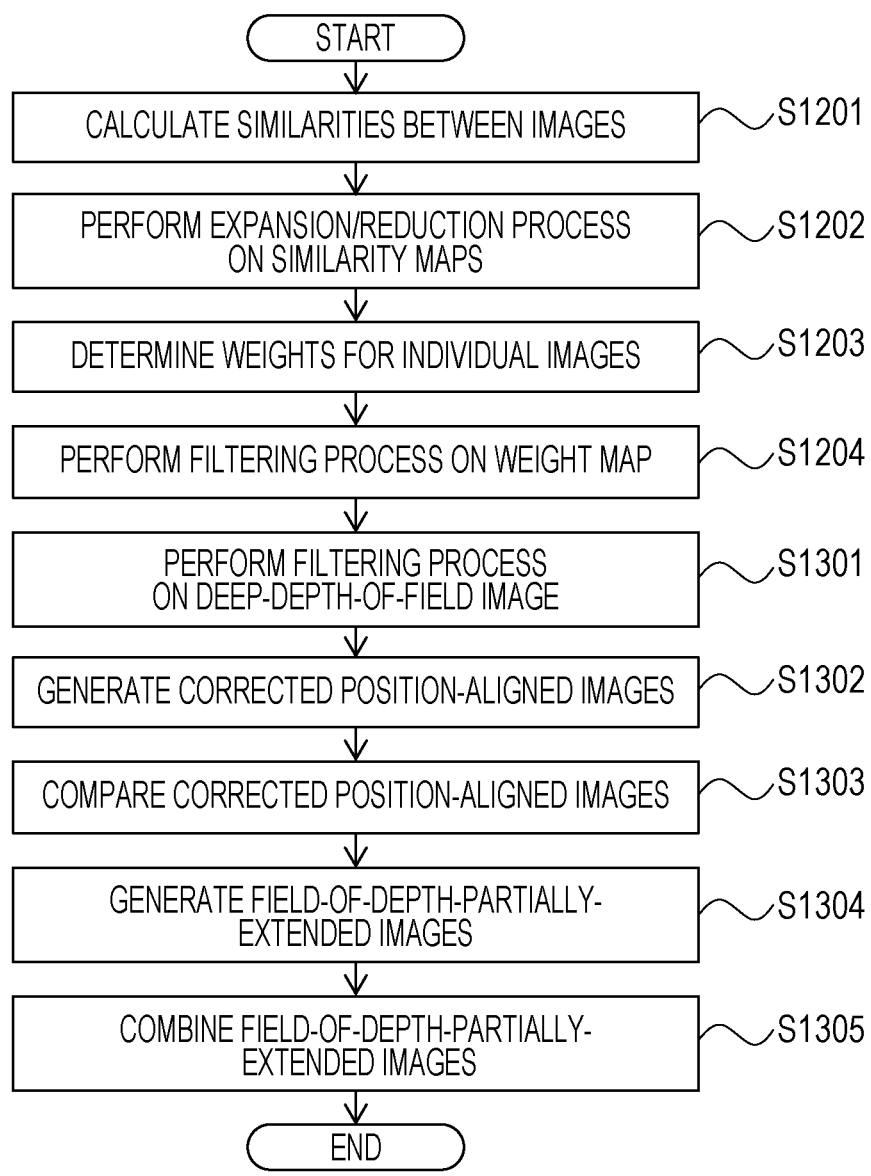
FIG. 13 is a flowchart illustrating a process performed by the depth-of-field extending unit according to a second exemplary embodiment.

In the first exemplary embodiment, the description has been given of an example of changing weights of to-be-combined images in accordance with the in-focus areas of the images used to generate a depth-of-field-extended image. In a second exemplary embodiment, a method for generating a depth-of-field-extended image having more natural blur will be described. In the second exemplary embodiment, contents of the depth-of-field extending process of step S504 are different from those of the first exemplary embodiment. Because the configuration of the camera 100 according to the second exemplary embodiment is similar to that of the first exemplary embodiment, a description thereof is omitted. The depth-of-field extending process performed by the camera 100 according to the second exemplary embodiment will be described with reference to a flowchart of FIG. 13. Note that processing steps similar to those of the first exemplary embodiment are denoted by the same references as those used in FIG. 12, and a description thereof is omitted.

In step S1301, the filter processing unit 1104 processes the image W by using a joint bilateral filter based on the position-aligned images A to C. A joint bilateral filer is a filter whose filtering coefficients to be used in processing are determined based on a distance from the processing-target pixel to a reference pixel and pixel values in a reference image different from the image including the processing-target pixel. In this step, a filtering process is performed three times, and, each time, the image W is set as the processing-target image and one of the position-aligned images A to C is set as the reference image. As a result, three images ImgFilter$_j$(x, y) that have been subjected to the filtering process are generated. The image ImgFilter$_j$(x, y) is denoted by Equation (10).

$$\mathrm{ImgFilter}_j(x, y) = \quad (10)$$

$$\frac{\Sigma_k \Sigma_l \mathrm{ImgDeep}\left(x - \frac{u-1}{2} + k, y + \frac{v-1}{2} + 1\right) \times h_j(x, y, k, l)}{uv}$$

$$h_j(x, y, k, l) = \exp\left(-\frac{\left(\frac{u-1}{2} - k\right)^2 + \left(\frac{v-1}{2} - 1\right)^2}{\sigma_s^2}\right) \exp$$

$$\left(-\frac{\left|\mathrm{ImgShift}_j(x, y) - \mathrm{ImgShift}_i\left(x - \frac{u-1}{2} + k, y + \frac{v-1}{2} + 1\right)\right|^2}{\sigma_r^2}\right)$$

Figure 14A:
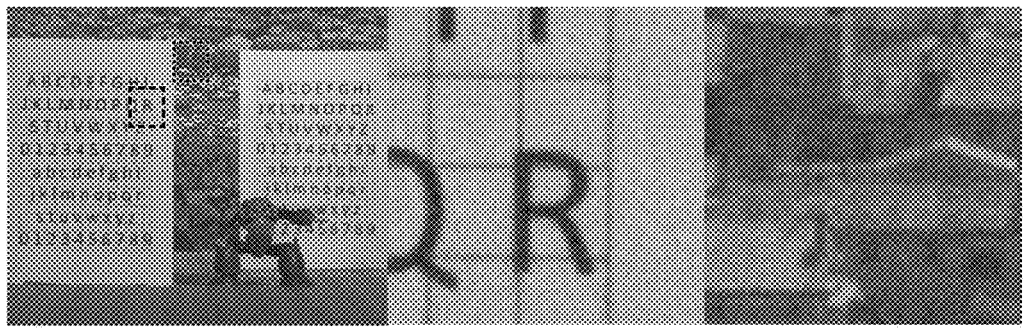
FIGS. 14A, 14B, and 14C are diagrams explaining a filtering process according to the second exemplary embodiment.
Figure 14B:
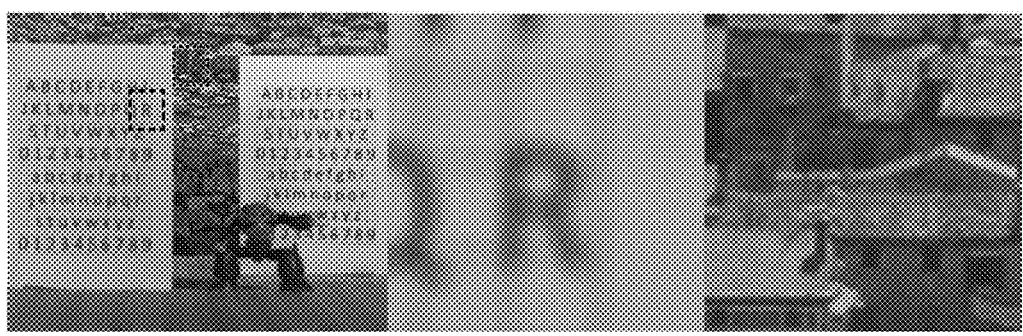
Figure 14C:
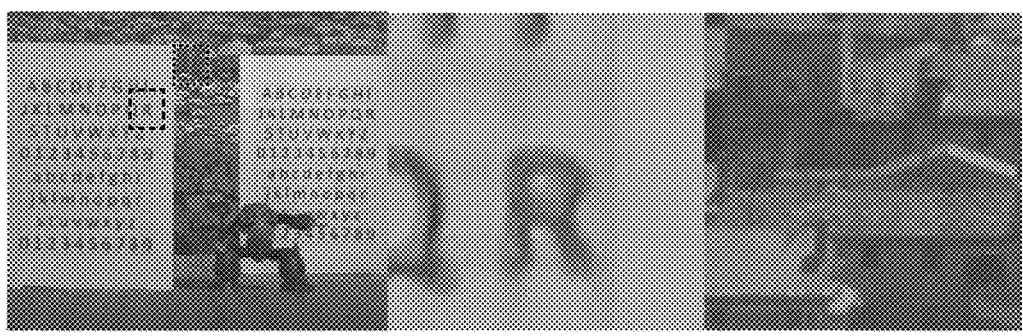

In Equation (10), h denotes a weight coefficient for each pixel in a patch subjected to a filtering process, $\sigma_s$ denotes a variance of a distance-based term of h, and $\sigma_r$ denotes a variance of a pixel-value-based term of h. Because three filtering-processed images generated in this step have already been subjected to filtering processes based on pixel values of the images A to C, the blur states in the images A to C are reflected in the resulting filtering-processed images. Examples of the images will be described with reference to FIGS. 14A to 14C. FIG. 14A illustrates the image W on which no filtering process has been performed, FIG. 14B illustrates the position-aligned image C focused at a distant view, and FIG. 14C illustrates the image W on which the joint bilateral filtering process is performed by using the image C as a reference image. The left portion of each image shows the entirety, the middle portion of each image shows an enlarged view of a close-view portion enclosed by a dashed line, and the right portion of each image shows an enlarged view of a distant view enclosed by a dotted line. Comparison of FIGS. 14A to 14C indicates that a sharp distant view is obtained in every image. As for the close view, a sharp image is obtained in the image W subjected to no filtering process, whereas blur is caused in the image W that has been subjected to the filtering process due to the influence of blur in the image C. The use of a joint bilateral filter can add blur corresponding to the blur state in a shallow-depth-of-field image to the image W. The filter processing unit 1104 applies the filter denoted by Equation (10) to the image W and outputs three resulting filtering-processed images to the combining unit 1105. The process then proceeds to step S1302. Note that the filter used in this step need not be a joint bilateral filter, and another type of filter such as a guided filter may be used.

In step S1302, the combining unit 1105 combines the images A to C and the filtering-processed image W, by using the filtering-processed image W and the filtering-processed weight value map input from the filter processing unit 1104. In this way, the combining unit 1105 generates three corrected position-aligned images. A pixel value ImgShift'$_j$(x, y) in the corrected position-aligned image is denoted by Equation (11).

$$\text{ImgShift}'_j(x,y) = W_j(x,y) \cdot \text{ImgShift}_j(x,y) + (1 - W_j(x,y)) \cdot \text{ImgFilter}_j(x,y) \tag{11}$$

The corrected position-aligned image denoted by Equation (11) is obtained by replacing out-of-focus areas in the position-aligned images A to C with the corresponding areas in the filtering-processed image W. The position-aligned images A to C are images whose positions have been aligned so that their in-focus areas are superimposed with the corresponding areas in the image W. Accordingly, out-of-focus areas in the position-aligned images A to C may be displaced from the corresponding areas in the image W. The combining process denoted by Equation (11) however corrects the images A to C so that the entire images A to C are superimposed with the image W. In addition, the blur states of the position-aligned images A to C which have been used as reference images in the filtering processes are reflected in the filtering-processed image W used in combining, and thus remain in the corrected position-aligned images. The combining unit 1105 generates three corrected position-aligned images by substituting pixel values in the filtering-processed image W and the position-aligned images A to C that have been input from the filter processing unit 1104 and the weight values into Equation (11). The process then proceeds to step S1303.

In step S1303, the combining unit 1105 compares the blur states of the three corrected position-aligned images generated in step S1302 and determines weight values used in a process for combining the three corrected position-aligned images. A method for determining weight values will be described below. When there are two images $g_1(x, y)$ and $g_2(x, y)$ focused at different positions, an evaluation value $J_{1,2}$ indicating a difference between the blur states of the two images is determined by Equation (12).

$$J_{1,2}(x, y; k) = \frac{\sum_{-r \le m,n \le r} \{g_1^{(k)}(x+m, y+n) - g_2(x+m, y+n)\}^2}{\sum_{-r \le m,n \le r} \{g_1(x+m, y+n) - g_2(x+m, y+n)\}^2} \tag{12}$$

Here, $g_1^{(k)}(x, y)$ denotes an image obtained by adding a different degree of blur to the image $g_1(x, y)$ in steps and r denotes a radius of the image block used for comparison of the blur states. Note that the image $g_1^{(k)}(x, y)$ is determined by Equation (13).

$$g_1^{(k)}(x,y) = h(x,y;k) * g_1(x,y) \tag{13}$$

In Equation (13), h(x, y; k) denotes a point spread function denoted by Equation (14).

$$h(x, y; k) = \frac{1}{\pi(k \Delta R)^2} \exp\left(-\frac{x^2 + y^2}{(k \Delta R)^2}\right) \tag{14}$$

In Equation (14), $\Delta R$ denotes an increase in the radius of blur. A weight value $b_{1,2}(x, y)$ applied to the image $g_1(x, y)$ is calculated based on Equation (15) by using the evaluation value $J_{1,2}$ denoted by Equation (12).

$$b_{1,2}(x, y) = 1 - \frac{\min_k \{J_{1,2}(x, y; k)\}}{th} \tag{15}$$

In Equation (15), th denotes a threshold parameter set in a range from 0 to 1. If the calculation result $b_{1,2}(x, y)$ takes a negative value, $b_{1,2}(x, y)$ can be replaced with 0. The combining unit 1105 substitutes $g_1(x, y)$, $g_2(x, y)$, and $g_3(x, y)$ which denote the three corrected position-aligned images into Equations (12) to (15). Based on the substituted values, weight values $b_{1,2}(x, y)$, $b_{2,1}(x, y)$, $b_{1,3}(x, y)$, $b_{3,1}(x, y)$, $b_{2,3}(x, y)$, and $b_{3,2}(x, y)$ are determined. Here, $b_{2,1}(x, y)$ denotes a weight applied to the image $g_2(x, y)$ when the images $g_1(x, y)$ and $g_2(x, y)$ are combined, and $b_{3,2}(x, y)$ denotes a weight applied to the image $g_3(x, y)$ when the images $g_2(x, y)$ and $g_3(x, y)$ are combined.

In step S1304, the combining unit 1105 combines the three corrected position-aligned images by using the weight values determined in step S1303 and generates three depth-of-field-partially-extended images. Here, three images are generated from three sets, each of which includes two images selected from the three corrected position-aligned images. For example, a depth-of-field-partially-extended image $g_{1,2}'(x, y)$ generated by combining the images $g_1(x, y)$ and $g_2(x, y)$ is denoted by Equation (16).

$$g'_{1,2}(x, y) = \frac{g_1(x, y) b_{1,2}(x, y) + g_2(x, y) b_{2,1}(x, y)}{b_{1,2}(x, y) + b_{2,1}(x, y)} \tag{16}$$

To combine images of another set, variables in Equation (16) are replaced with pixel values and weight values of the corresponding images. The combining unit 1105 substitutes weight values and pixel values of the images into Equation (16) and generates depth-of-field-partially-extended images $g_{1,2}'(x, y)$, $g_{1,3}'(x, y)$, and $g_{2,3}'(x, y)$. The process proceeds to step S1305.

In step S1305, the combining unit 1105 combines the three depth-of-field-partially-extended images generated in step S1304 to generate a final output image Output(x, y), the entire area of which is in focus. The depth-of-field-partially-extended images are combined in accordance with Equation (17).

$$\text{Output}(x,y) = \text{MEDIAN}(g_{1,2}'(x,y), g_{1,3}'(x,y), g_{2,3}'(x,y)) \tag{17}$$

In Equation (17), MEDIAN(A, B, C) denotes a function that outputs the median of given pixel values A, B, and C.

The depth-of-field-partially-extended images $g_{1,2}'(x, y)$, $g_{1,3}'(x, y)$, and $g_{2,3}'(x, y)$ are each substantially focused on at two distances from among three distances, i.e., a short range, a middle range, and a long range. Accordingly, outputting the median of the pixel values in the depth-of-field-partially-extended images $g_{1,2}'(x, y)$, $g_{1,3}'(x, y)$, and $g_{2,3}'(x, y)$ at the same coordinates can yield pixel values of image information focused at all of the short range, the middle range, and the long range. The combining unit 1105 substitutes pixel values of the three depth-of-field-partially-extended images into Equation (17) and outputs the generated output image to the display control unit 306 and the external memory control unit 311, for example. The process then ends.

The flow of the depth-of-field extending process performed by the camera 100 according to the second exemplary embodiment has been described above. The above-described process can provide a depth-of-field-extended image having more natural blur than an image of the first exemplary embodiment.

Other Exemplary Embodiments

In the first and second exemplary embodiments above, an example has been described in which the camera 100 automatically decides upon a pixel value of which image is to be applied to which area when generating a depth-of-field-extended image by combining a plurality of obtained images; however, assignment of the pixel value may be decided upon using another method. For example, images that have been subjected to position alignment and combining by using the method of the above-described exemplary embodiments may be displayed to a user and the user may be allowed to fine tune the combining weights of the images in accordance with the displayed images. An exemplary interface for use in such an operation may be designed such that a boundary at which the image having the largest combining weight is switched to another one is displayed to a user and the user is allowed to change the weight by entering an instruction for morphing the boundary. For example, the gradient of the weight applied to each image may be changed at each position by moving the boundary or continuity may be added to the weight at the boundary by blurring the boundary.

The exemplary embodiments of the present invention may be implemented by a process performed as a result of one or more processors of a computer of a system or apparatus, which is supplied with a program implementing one or more functions of the above-described exemplary embodiments via a network or recording medium, loading and executing the program. In addition, the exemplary embodiments of the present invention may be implemented by a circuit (e.g., an application specific integrated circuit (ASIC)) that implements one or more functions.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-118114, filed Jun. 6, 2014, which is hereby incorporated by reference herein in its entirety.

What is claimed is:

1. An image processing apparatus comprising:
an obtaining unit configured to obtain a first image, a second image, and a third image, the first image being an image captured with focus set at a first distance, the second image being an image captured with focus set at a second distance different from the first distance, the third image being an image captured using an f-number larger than an f-number used in capturing of the first image and the second image;
an arranging unit configured to arrange at least a part of the first image and at least a part of the second image at a position based on the third image, wherein the arranging unit shifts the first image and the second image such that a first subject in the first image is superimposed with the first subject in the third image, the first subject being located at the first distance, and such that a second subject in the second image is superimposed with the second subject in the third image, the second subject being located at the second distance; and
a combining unit configured to generate a composite image having a deeper depth of field than the first image and the second image by combining the first image and the second image that have been arranged by the arranging unit.

2. The image processing apparatus according to claim 1, wherein the combining unit includes a calculating unit configured to calculate a parameter indicating, for each image area corresponding to an identical position in the first image that has been arranged by the arranging unit and the third image, a similarity between the first image and the third image and indicating, for each image area corresponding to an identical position in the second image that has been arranged by the arranging unit and the third image, a similarity between the second image and the third image, and
wherein the combining unit generates a composite image in accordance with the parameter.

3. The image processing apparatus according to claim 2, wherein the combining unit makes a weight of the first image used in the combining larger than a weight of the second image in an image area for which the similarity between the first image and the third image is higher than the similarity between the second image and the third image, and makes the weight of the second image used in the combining larger than the weight of the first image in an image area for which the similarity between the second image and the third image is higher than the similarity between the first image and the third image.

4. The image processing apparatus according to claim 3, wherein the combining unit generates a composite image by combining the first image, the second image, and the third image, makes a weight of the third image used in the combining smaller than the weights of the first image and the second image in an image area for which at least one of the similarity between the first image and the third image and the similarity between the second image and the third image exceeds a certain threshold, and makes the weight of the third image used in the combining larger than the weights of the first image and the second image in an image area for which neither the similarity between the first image and the third image nor the similarity between the second image and the third image exceeds the certain threshold.

5. An image capturing apparatus comprising:
the image processing apparatus according to claim 1;
a first image capturing unit configured to capture the first image;
a second image capturing unit configured to capture the second image; and
a third image capturing unit configured to capture the third image.

6. An image processing method comprising:
obtaining a first image, a second image, and a third image, the first image being an image captured with focus set at a first distance, the second image being an image captured with focus set at a second distance different from the first distance, the third image being an image captured using an f-number larger than an f-number used in capturing of the first image and the second image;
arranging the first image and the second image, based on the third image, wherein the arranging shifts the first image and the second image such that a first subject in the first image is superimposed with the first subject in the third image, the first subject being located at the first distance, and such that a second subject in the second image is superimposed with the second subject in the third image, the second subject being located at the second distance; and
generating a composite image having a deeper depth of field than the first image and the second image by combining the first image and the second image that have been arranged by the arranging.

7. A non-transitory computer-readable recording medium storing a program causing a computer to perform an image processing method, the image processing method comprising:
obtaining a first image, a second image, and a third image, the first image being an image captured with focus set at a first distance, the second image being an image captured with focus set at a second distance different from the first distance, the third image being an image captured using an f-number larger than an f-number used in capturing of the first image and the second image;
arranging the first image and the second image, based on the third image, wherein the arranging shifts the first image and the second image such that a first subject in the first image is superimposed with the first subject in the third image, the first subject being located at the first distance, and such that a second subject in the second image is superimposed with the second subject in the third image, the second subject being located at the second distance; and
generating a composite image having a deeper depth of field than the first image and the second image by combining the first image and the second image that have been arranged by the arranging.

* * * * *